(12) United States Patent
T et al.

(10) Patent No.: US 9,183,154 B2
(45) Date of Patent: Nov. 10, 2015

(54) METHOD AND SYSTEM TO MAINTAIN MAXIMUM PERFORMANCE LEVELS IN ALL DISK GROUPS BY USING CONTROLLER VDS FOR BACKGROUND TASKS

(71) Applicant: LSI CORPORATION, San Jose, CA (US)

(72) Inventors: Hariharan T, Milpitas (CA); Madan Mohan Munireddy, Bangalore (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 300 days.

(21) Appl. No.: 13/736,149

(22) Filed: Jan. 8, 2013

(65) Prior Publication Data

US 2014/0195732 A1 Jul. 10, 2014

(51) Int. Cl.
*G06F 12/00* (2006.01)
*G06F 12/08* (2006.01)

(52) U.S. Cl.
CPC ........ *G06F 12/0871* (2013.01); *G06F 12/0831* (2013.01); *G06F 12/0866* (2013.01)

(58) Field of Classification Search
CPC ............ G06F 12/0871; G06F 12/0831; G06F 12/0866
USPC .................................................. 711/118, 141
See application file for complete search history.

(56) References Cited

U.S. PATENT DOCUMENTS 8,694,724 B1 * 4/2014 Linnell et al. ................. 711/114

* cited by examiner

*Primary Examiner* — Matthew Bradley
(74) *Attorney, Agent, or Firm* — Duft Bornsen & Fettig, LLP

(57) ABSTRACT

Disclosed is a system and method for performing reconstruction or on-line capacity expansion, background tasks, on a disk group configured on a controller with minimal impact on the other disk groups configured on the same controller. A user is enabled to continuously experience increased performance on all source virtual disks configured on the controller since the DRAM is always dedicated for I/O performance.

23 Claims, 2 Drawing Sheets

METHOD AND SYSTEM TO MAINTAIN MAXIMUM PERFORMANCE LEVELS IN ALL DISK GROUPS BY USING CONTROLLER VDS FOR BACKGROUND TASKS

FIELD OF THE INVENTION

The field of the invention relates generally to computer storage systems and more particularly to performance of background tasks.

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems. A solution to these increasing demands is the use of redundant arrays of multiple inexpensive disks (RAID).

Multiple disk drive components may be combined into logical units. Data may then be distributed across the drives in one of several ways. RAID is an umbrella term for computer storage schemes that can divide and replicate data among multiple physical drives. The physical drives are considered to be in groups of drives, or disks. Typically the array can be accessed by an operating system, or controller, as a single drive.

In disk groups, typically, all virtual disks configured on other disk groups are moved to write-through mode when a reconstruction or on-line capacity expansion is in progress. All disk groups use DRAM resources during Reconstruction or On-line Capacity Expansion . During such operations, every Virtual Disk configured on the Controller is invariably moved to write-through mode.

SUMMARY OF THE INVENTION

An embodiment of the invention may therefore comprise a method of performing a background operation on a first disk group while at least one other disk group performs normal caching, wherein each of said first and other disk groups comprise cache contents, said method comprising determining if there are any write-through secondary cache disks configured, if a write-through disk is configured invalidating the cache contents of the write-through secondary cache disk, dissociating the secondary cache write-through disk from a source disk, and using the write-through secondary cache disk for the background function, if a write-through secondary cache disk is not configured, identifying a suitable write-back secondary cache disk, flushing the cached contents of the suitable write-back secondary cache disk to a respective source disk, dissociating the write-back secondary cache disk from the source disk, and using the write-back secondary cache disk for the background operation, and upon completing of the background operation, restoring secondary cache disk cache policies, and reverting any dissociated disks back to being associated with a source disk as originally associated.

An embodiment of the invention may further comprise a system for performing background tasks on a plurality of disk groups, said system comprising a controller enabled to perform the background tasks on said plurality of disks, wherein the controller determines if a write-through virtual disk is configured, the controller invalidates any contents of the write-through disk cache, and when a write-through virtual disk is not configured, the controller identifies a suitable write-back virtual disk and flushes data from the write-back virtual disk, the controller uses the virtual disk for the background task, and when the background task is complete, the controller reverts the virtual disk associations and cache policies back.

DETAILED DESCRIPTION OF THE EMBODIMENTS

Figure 1:
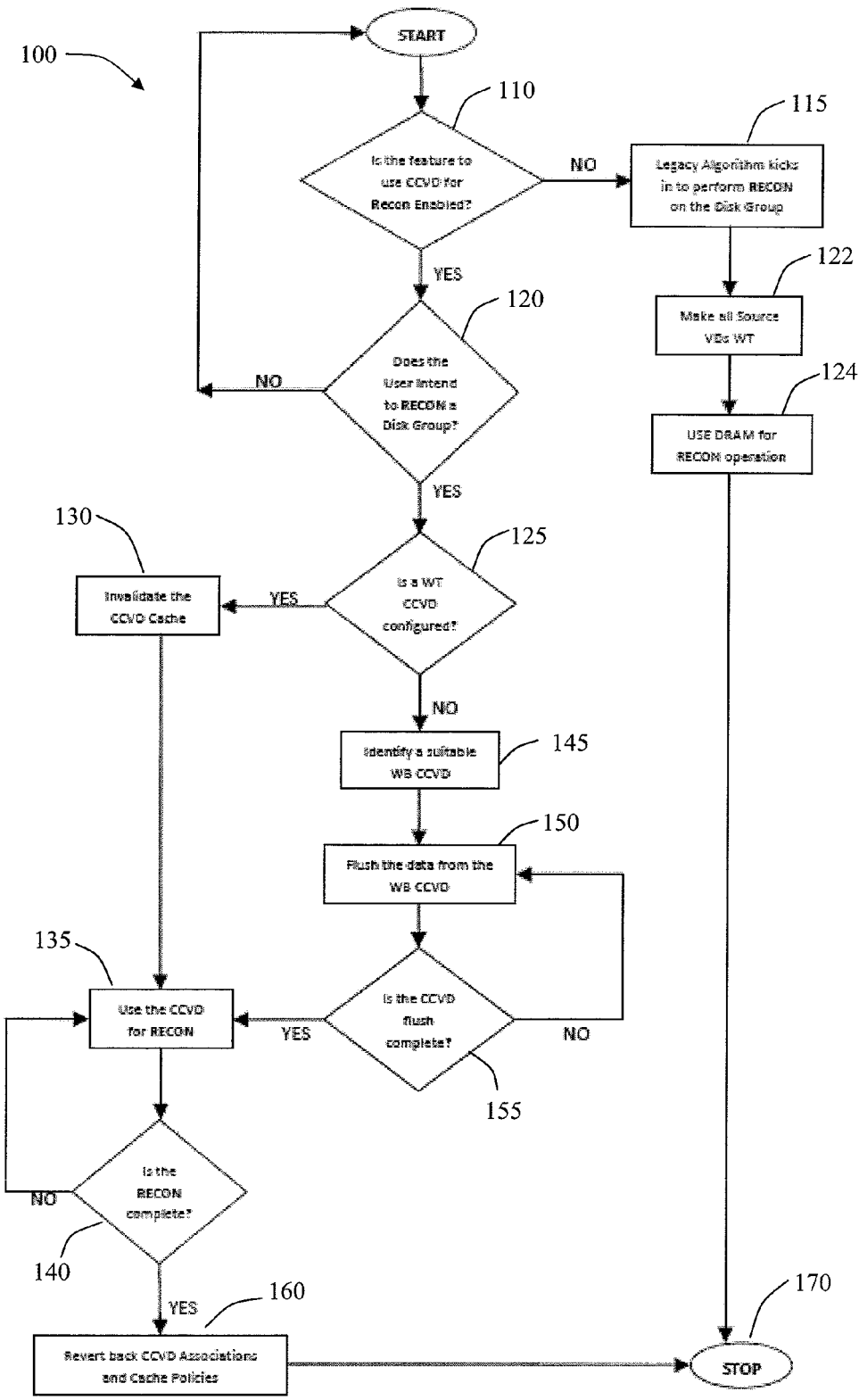
FIG. 1 is a flow diagram of a method for a background operation in a controller in an exemplary embodiment.

In a large enterprise server, RAID controllers may connect to large mass arrays of HDD that serve data out to 'customers'. There may be a level of small cache that is built into the controller. This level of small cache is usually around 1 GB, and rarely above 4 GB of RAM, and mainly used to alleviate high write loads. On server arrays where the amount of data can go into hundreds of Terabytes, this sized cache may be inconsequential.

A storage caching system is implementable for use with RAID controllers. Such systems may obtain a balance between HDD capacity and SSD speed. A supplemental layer of cache between an HDD and the controller may be created. This cache can be much larger using SSDs that use much lower access times and much higher random I/O speeds than HDD can attain.

Reconstruction or on-line capacity expansion are often required in RAID systems. Typically, whenever a reconstruction or on-line capacity expansion are required or in progress on a Disk Group, all of the Virtual Disks (VDs) configured on other Disk Groups may be moved to a Write-Through (WT) mode. Available DRAM may be used to capacity for the noted reconstruction or on-line capacity expansion. Other operations, such as Rebuild or Parity Calculation, will also be sharing the available DRAM capacity.

Write through is a storage method in which data is written into the cache and a corresponding main memory location at the same time. The cached data allows for fast retrieval on demand, while the same data in main memory ensures that nothing will get lost if a crash, power failure, or other system disruption occurs. Write-through may minimize the risk of data loss but every write operation must be done twice. The active application program must wait until each block of data has been written into both the main memory and the cache before starting the next operation.

Write-through is a method of data storage in applications where data loss cannot be tolerated, such as banking and medical device control. In less critical applications, and especially when data volume is large, an alternative method called write-back may be used.

Write-back is a caching method in which modifications to data in the cache are not copied to the cache source until absolutely necessary. Instead, the cache tracks which locations have been written over (these locations may be marked as dirty). The data in these locations are written back to the main memory only when the data is evicted from the cache. For this reason, a miss in a write back cache may sometimes require two memory accesses to service—one to first write the dirty location to memory and then another to read the new location from memory. Write-back caching may, in some circumstances, result in fewer write operations to main memory. However, with the performance improvement comes a slight risk that data may be lost if the system crashes. The term write back may at some points be referred to as copy back.

Write-through may be faster for heavy loads than write back. However, write-back may be faster than write through for light loads. Proper server configuration may make one method faster than the other.

In an embodiment of the invention a background operation is performed on a Disk Group. There may be many more Disk Groups operating in the system. Initially, a customer may initiate the background operation by enabling a particular feature in the system. The background operation may be a disk reconstruction or an on-line capacity expansion.

A disk Reconstruction or an On-line Capacity Expansion may be performed on a configured disk. A firmware tool may be enabled to check if there are any write-through disks configured. The write-through disk may be a virtual disk. The virtual disk may be a Cache Cade virtual disk.

If a write-through disk is found to be configured, the firmware tool will invalidate the cache contents of the disk. This will be the READ ONLY cache contents. The firmware will also dissociate the disk from the Source disk. The disk can then be used for the background task, i.e. reconstruction or on-line capacity expansion.

If a write-through disk is not found to be configured, a suitable write back disk will be identified. The write-back disk may be a virtual disk. The virtual disk may be a Cache Cade virtual disk. The firmware tool will flush the cached data from the disk to a respective Source disk. The disk will then be dissociated from the source disk. The disk can then be used for the background task, i.e. reconstruction or on-line capacity expansion.

Upon completion of the background task, the cache policies of the disk will be restored. The disk will be reverted back to being associated with the appropriate Source disk as it was originally associated. The disk will continue to cache data in a normal manner.

The above embodiment allows for the background tasks to be performed on a Disk Group with minimal or no impact on other Disk Groups configured with the same controller. With the described embodiment, continued best performance on all source virtual disks configured on the controller will continue because the DRAM is always dedicated for I/O performance. This is because the DRAM, which is used by other processes in the other Disk Groups, will not be used for the reconstruction or on-line capacity expansions operations. Controller throughput is not reduced due to DRAM availability being limited to other Disk Groups during the background operations.

FIG. 1 is a flow diagram of a method for a background operation in a controller. A Cachecade VD may be a Secondary Cache that is configured using SSD (Solid State) drives to accelerate the Controller throughput. Typically these CCVDs are configured (using SSDs) and associated to the Virtual Disks (configured using HDDs (Hard Disk Drives)). In such a scenario, CCVDs (configured in WB mode) possibly might have some dirty data meant to be written to Source VDs (configured using HDDs). This data is flushed to the Source VDs before making it write-through and used for Reconstruction operations. DRAM cache is not used for Reconstruction in this case.

In the diagram of FIG. 1, a particular embodiment is used for purposes of explanation. For example, it is assumed that CacheCade is the controller being used to perform background tasks, such as reconstruction, on CacheCade Virtual Disks (CCVDs).

In the method 100 illustrated in the diagram, a first decision 110 is made to determine if an appropriate function in the controller has been enabled. If the function has not been enabled, a legacy algorithm will be employed to perform the reconstruction 115. All source virtual disks will be made to write-through 122 and DRAM will be used for the reconstruction operation 124.

If the appropriate feature has been enabled, it is next determined if the reconstruction is desired 120. If the reconstruction is not desired, the process will restart. If the reconstruction is desired, it next needs to be determined if a write-through Secondary Cache disk (CCVD) has been configured 125. The write-through disk may be a virtual disk and may be controlled by CacheCade as indicated 125.

The first major branch occurs at step 125. If a write-through Secondary Cache disk/Cachecade device has been configured, the controller will proceed to invalidate the disk cache 130. The controller will then use the write-through Secondary Cache disk/Cachecade device for a reconstruction 135. Once the reconstruction is complete 140, the controller will revert the disk associations back to how they were before the reconstruction began and also revert back to previous cache policies 160. The reconstruction will then stop 170 and normal data caching will ensue.

If a write-through Secondary Cache disk/Cachecade device has not been configured, the controller will identify a suitable write-back Cachecade disk/CCVD 145. As before, this write-back Cache disk/CCVD disk may be a virtual disk. The data from the write-back Cache disk/CCVD will be flushed by the controller 150. Once the disk flush is complete 155, the controller will use the write-back Cache disk/CCVD for the reconstruction 135. The method of the embodiment will continue until reconstruction is complete 140 and then revert the disk associations and cache policies back 160 before completing the process 170. Normal data caching will continue.

Figure 2:
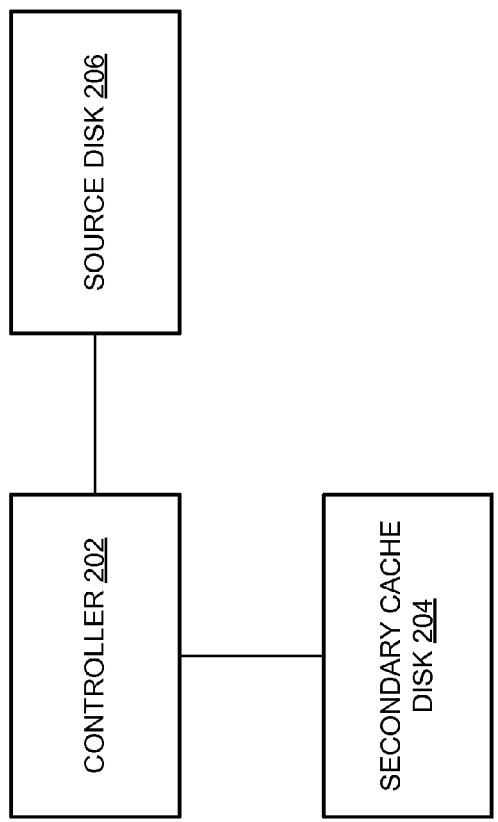
FIG. 2 is a block diagram of a storage caching system in an exemplary embodiment.

Effectively, Secondary cache disk (also referred to as CCVD) is used for Reconstruction operations which need DRAM resources. If the CCVD is write-through, it won't have any dirty data, so its contents are invalidated and it is used for Reconstruction. If the CCVD is writeback, the dirty data is flushed to the respective Source VDs, and the CCVD is moved to writethrough mode and then used for Reconstruction. In either case, after Reconstruction completion, the CCVD is reverted back to original mode (write-through or write-back) and re-associated to its Source VDs to ensue caching. FIG. 2 is a block diagram of a storage caching system 200 in an exemplary embodiment. In this embodiment a controller 202 is coupled with a secondary cache disk 204 and a source disk 206.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of performing a background operation on a first disk group while at least one other disk group performs normal caching, wherein each of said first and other disk groups comprises cache contents, said method comprising:
 determining if there are any write-through Secondary Cache disks configured;
 if a write-through Secondary Cache disk is configured:
  invalidating cache contents of the write-through Secondary Cache disk;
  dissociating the write-through Secondary Cache disk from a source disk; and
  using the write-through Secondary Cache disk for the background operation;
 if a write-through Secondary Cache disk is not configured:
  identifying a write-back Secondary Cache disk;
  flushing cached contents of the write-back Secondary Cache disk to a source disk;
  dissociating the write-back Secondary Cache disk from the source disk; and
  using the write-back Secondary Cache disk for the background operation; and
 upon completing of the background operation:
  restoring Secondary Cache disk cache policies; and
  reverting any dissociated Secondary Cache disks back to being associated with the source disk as originally associated.

2. The method of claim 1, wherein the background operation comprises at least one of a reconstruction and an on-line capacity expansion.

3. The method of claim 1, wherein:
 the steps associated with if a write-through Secondary Cache disk is configured are performed by firmware; and
 the steps associated with if a write-through Secondary Cache disk is not configured are performed by firmware.

4. The method of claim 1 further comprising enabling the background operation.

5. The method of claim 4 further comprising continuing normal data caching operations upon completing of the background operation.

6. The method of claim 4, wherein:
 the steps associated with if a write-through Secondary Cache disk is configured are performed by firmware; and
 the steps associated with if a write-through Secondary Cache disk is not configured are performed by firmware.

7. The method of claim 6, wherein the background function comprises at least one of a reconstruction and an on-line capacity expansion.

8. The method of claim 1 wherein the Secondary Cache disks comprise Solid State Disks (SSDs).

9. The method of claim 1 wherein the source disk comprises a virtual disk.

10. The method of claim 1 wherein the source disk comprises at least one Hard Disk Drive (HDD).

11. The method of claim 1 further comprising:
 determining if a function has been enabled for using the Secondary Cache disks to perform the background operation; and
  utilizing the Secondary Cache disks to perform the background operation responsive to determining that the function has been enabled; and
  utilizing Dynamic Random Access Memory (DRAM) to perform the background operation responsive to determining that the function has not been enabled.

12. A system for performing a background operation on a first disk group while at least one other disk group performs normal caching, wherein each of said first and other disk groups comprises cache contents, the apparatus comprising:
 a controller configured to determine if there are any write-through Secondary Cache disks configured;
 if a write-through Secondary Cache disk is configured, the controller is further configured to:
  invalidate cache contents of the write-through Secondary Cache disk;
  dissociate the write-through Secondary Cache disk from a source disk; and
  use the write-through Secondary Cache disk for the background operation;
 if a write-through Secondary Cache disk is not configured, the controller is further configured to:
  identify a write-back Secondary Cache disk;
  flush cached contents of the write-back Secondary Cache disk to a source disk;
  dissociate the write-back Secondary Cache disk from the source disk; and
  use the write-back Secondary Cache disk for the background operation; and
 upon completion of the background operation, the controller is further configured to:
  restore Secondary Cache disk cache policies; and
  revert any dissociated Secondary Cache disks back to being associated with the source disk as originally associated.

13. The system of claim 12, wherein the background operation comprises at least one of a reconstruction and an on-line capacity expansion.

14. The system of claim 12 wherein the controller is further configured to continue normal data caching operations upon the completion of the background operation.

15. The system of claim 12 wherein the Secondary Cache disks comprise Solid State Disks (SSDs).

16. The system of claim 12 wherein the source disk comprises a virtual disk.

17. The system of claim 12 wherein the source disk comprises at least one Hard Disk Drive (HDD).

18. The system of claim 12 wherein the controller is further configured to:
 determine if a function has been enabled for using the Secondary Cache disks to perform the background operation; and
 utilize the Secondary Cache disks to perform the background operation responsive to determining that the function has been enabled; and
 utilize Dynamic Random Access Memory (DRAM) to perform the background operation responsive to determining that the function has not been enabled.

19. A method operable in a storage controller for performing a background operation on a source disk utilizing a secondary cache Solid State Disk (SSD) instead of Dynamic Random Access Memory (DRAM) on the storage controller, the method comprising:
 determining if the secondary cache SSD is configured to perform write-through caching for the source disk;
 if the secondary cache SSD is configured to perform the write-through caching:
  suspending the write-through caching;
  utilizing the secondary cache SSD instead of the DRAM to perform calculations to implement the background operation on the source disk; and
  restoring the write-through caching upon completing the background operation on the source disk;
 if the secondary cache SSD is not configured to perform the write-through caching:

identifying another secondary cache SSD that is configured to perform write-back caching for the source disk;
suspending the write-back caching;
flushing cached data from the other secondary cache SSD to the source disk;
utilizing the other secondary cache SSD instead of the DRAM to perform calculations to implement the background operation on the source disk; and
restoring the write-back caching upon completing the background operation on the source disk.

20. The method of claim 19 wherein the background operation comprises at least one of a reconstruction of the source disk and an on-line capacity expansion of the source disk.

21. The method of claim 19 wherein the source disk comprises a virtual disk.

22. The method of claim 19 wherein the source disk comprises at least one Hard Disk Drive (HDD).

23. The method of claim 19 further comprising:
determining if a function has been enabled on the storage controller for utilizing secondary cache SSDs to perform calculations to implement the background operation on the source disk instead of the DRAM; and
utilizing the secondary cache SSDs instead of the DRAM to perform the calculations responsive to determining that the function has been enabled on the storage controller; and
utilizing the DRAM instead of the secondary cache SSDs to perform the calculations responsive to determining that the function has not been enabled on the storage controller.

* * * * *